United States Patent
Morita

(10) Patent No.: US 12,375,504 B2
(45) Date of Patent: Jul. 29, 2025

(54) ANALYSIS DEVICE AND ANALYSIS METHOD

(71) Applicant: HITACHI ASTEMO, LTD., Hitachinaka (JP)

(72) Inventor: Nobuyoshi Morita, Ibaraki (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 408 days.

(21) Appl. No.: 17/772,704

(22) PCT Filed: Sep. 18, 2020

(86) PCT No.: PCT/JP2020/035389
§ 371 (c)(1),
(2) Date: Apr. 28, 2022

(87) PCT Pub. No.: WO2021/084961
PCT Pub. Date: May 6, 2021

(65) Prior Publication Data
US 2022/0407873 A1    Dec. 22, 2022

(30) Foreign Application Priority Data

Oct. 29, 2019 (JP) ................................. 2019-195872

(51) Int. Cl.
*H04L 9/40* (2022.01)
(52) U.S. Cl.
CPC ...... *H04L 63/1416* (2013.01); *H04L 63/1433* (2013.01); *H04L 63/145* (2013.01)
(58) Field of Classification Search
CPC ............. H04L 63/1416; H04L 63/1433; H04L 63/145; H04L 67/12; H04L 67/52; H04L 63/1425; G06F 21/55
See application file for complete search history.

(56) References Cited

U.S. PATENT DOCUMENTS

2005/0091513 A1*  4/2005  Mitomo .............. H04L 63/1408
                                                          713/188
2017/0046519 A1*  2/2017  Cam .......................... G06N 7/01
(Continued)

FOREIGN PATENT DOCUMENTS

JP    2005-136526 A    5/2005
JP    2019-046207 A    3/2019
(Continued)

OTHER PUBLICATIONS

International Search Report with English translation and Written Opinion issued in corresponding application No. PCT/JP2020/035389 dated Dec. 28, 2020.

*Primary Examiner* — Farid Homayounmehr
*Assistant Examiner* — Suman Debnath
(74) *Attorney, Agent, or Firm* — Foley & Lardner LLP

(57) ABSTRACT

An appropriate countermeasure is taken against a cybersecurity attack at an appropriate timing. An analysis device, configured using a computer including a computation device that executes predetermined computation processing and a storage device accessible by the computation device, includes: a communication unit that receives, by the computation device, a log of an information processing device mounted on an instrument; an attack progress analysis unit that calculates, by the computation device, an intrusion location in a route from an intrusion point on the instrument to a protected asset from the received log; and an urgency degree determination unit that determines, by the computation device, an urgency degree of a countermeasure against an attack based on an analysis result of the attack progress analysis unit.

12 Claims, 6 Drawing Sheets

(56) References Cited

U.S. PATENT DOCUMENTS

| | | | |
|---|---|---|---|
| 2018/0295147 A1* | 10/2018 | Haga | H04L 67/12 |
| 2020/0097663 A1* | 3/2020 | Sato | G06F 21/577 |
| 2021/0044612 A1* | 2/2021 | Kawauchi | B60W 50/0225 |
| 2021/0067528 A1* | 3/2021 | Tasaki | H04L 63/1408 |
| 2021/0237665 A1 | 8/2021 | Tamura et al. | |

FOREIGN PATENT DOCUMENTS

| | | |
|---|---|---|
| JP | 2019-125344 A | 7/2019 |
| JP | 2019-133599 A | 8/2019 |

* cited by examiner

FIG. 3A

SYSTEM VIOLATION UPDATE RULE (1611)

| THREAT ID | DEVICE/COMMUNICATION ID (1613/1614) | | | | | |
|---|---|---|---|---|---|---|
| | Dev1 | Dev2 | ... | Com1 | Com2 | ... |
| 0x01 | 10 | — | ... | 15 | — | ... |
| 0x02 | — | 10 | ... | — | 15 | ... |
| ... | ... | ... | ... | ... | ... | ... |

CORRELATED SCENARIO UPDATE RULE (1621)

| THREAT ID | SCENARIO ID | | | |
|---|---|---|---|---|
| | S1 | S2 | S3 | ... |
| 0x01 | 10 | — | 5 | ... |
| 0x02 | — | 15 | — | ... |
| ... | ... | ... | ... | ... |

VEHICLE SITUATION INFORMATION (VIOLATION DEGREE)

| DEVICE/COMMUNICATION ID (1631) | VIOLATION DEGREE (1632) |
|---|---|
| Dev1 | 320 |
| Dev2 | 100 |
| ... | ... |
| Com1 | 265 |
| Com2 | 80 |
| ... | ... |

FIG. 4B

VEHICLE SITUATION INFORMATION
(SCENARIO CORRELATION DEGREE)

| SCENARIO ID (1633) | CORRELATION DEGREE (1634) |
|---|---|
| S1 | 130 |
| S2 | 75 |
| S3 | 30 |
| ... | ... |

FIG. 5

PROGRESS STATUS UPDATE THRESHOLD INFORMATION

| DEVICE/ COMMUNICATION ID (1641) | THRESHOLD (1642) |
|---|---|
| Dev1 | 150 |
| Dev2 | 100 |
| ... | ... |
| Com1 | 150 |
| Com2 | 100 |
| ... | ... |

FIG. 6

ATTACK PROGRESS INFORMATION UPDATE RULE

| DEVICE/ COMMUNICATION ID (1651) | SCENARIO ID (1652) | | | |
|---|---|---|---|---|
| | S1 | S2 | S3 | ... |
| Dev1 | 3 | — | 2 | ... |
| Dev2 | | | | |
| ... | — | 1 | — | ... |
| Com1 | 4 | — | — | ... |
| ... | ... | ... | ... | ... |

FIG. 7

| SCENARIO ID (1661) | PROGRESS STATUS (1662) |
|---|---|
| S1 | 4 |
| S2 | 1 |
| S3 | 2 |
| ... | ... |

ATTACK PROGRESS INFORMATION

FIG. 8

| SCENARIO ID (1671) | TOTAL NUMBER OF STEPS (1672) |
|---|---|
| S1 | 7 |
| S2 | 6 |
| S3 | 9 |
| ... | ... |

SCENARIO STEP INFORMATION

FIG. 9

| SCENARIO ID (1681) | NUMBER OF REMAINING STEPS (1682) |
|---|---|
| S1 | 3 |
| S2 | 5 |
| S3 | 7 |
| ... | ... |

URGENCY DEGREE INFORMATION

MEASURE SELECTION INFORMATION

ANALYSIS DEVICE AND ANALYSIS METHOD

TECHNICAL FIELD

The present invention relates to an analysis device, and particularly to an analysis technique for a security attack.

BACKGROUND ART

As vehicles such as automobiles are becoming more connected and using open source software (OSS) more and more, there is a high possibility that more vulnerabilities are exploited. Further, there is a concern about exposure to cyber-security threats such as malware. As a countermeasure against such threats, an intrusion detection technology for detecting the occurrence of a cyber-security attack based on an event occurring at the time of receiving the attack has started to be introduced. In general, in a case where a cyber-security attack is detected by the intrusion detection technology, a countermeasure for maintaining a safe state is executed. For example, when unauthorized communication is detected, a target system executes a countermeasure for interrupting the communication.

In an in-vehicle system that places importance on availability, however, even when a cyber-security attack is detected, an excessive countermeasure or delay of the countermeasure may occur unless the degree of danger of the detected cyber-security attack is accurately determined. JP 2019-046207 A discloses a technology for analyzing an effect of an attack based on a result of intrusion detection. JP 2019-046207 A discloses a security countermeasure support system of a plant including: an abnormality determination means that determines whether an abnormality of data acquired from a plant control device or a monitoring operation device is caused by a cyber-attack; an effect determination means that analyzes parameter information of the data determined to be caused by the cyber-attack by the abnormality determination means based on a scenario of the cyber-attack, a risk caused by the cyber-attack, and vulnerability of plant equipment to the cyber-attack, and calculates a possibility of propagation to the plant equipment; and a display means that displays a measure for the plant equipment based on a determination result of the effect determination means (see claim 1).

CITATION LIST

Patent Literature

PTL 1: JP 2019-46207 A

SUMMARY OF INVENTION

Technical Problem

In the technology described in PTL 1, a device affected by the attack that has occurred is identified, the importance of the affected device is determined, and a countermeasure corresponding to the importance is selected. However, in a system in which there are a plurality of important devices, it is difficult to distinguish the importance of all the devices. Further, there is a possibility that the important devices fall into critical states before being intruded.

The present invention has been made in view of the above problems, and an object thereof is to provide an analysis device capable of executing an appropriate countermeasure at an appropriate timing when a cyber-security attack is detected in a traveling vehicle.

Solution to Problem

A typical example of the invention disclosed in the present application is as follows. That is, an analysis device, configured using a computer including a computation device that executes predetermined computation processing and a storage device accessible by the computation device, includes: a communication unit that receives, by the computation device, a log of an information processing device mounted on an instrument; an attack progress analysis unit that calculates, by the computation device, an intrusion location in a route from an intrusion point on the instrument to a protected asset from the received log; and an urgency degree determination unit that determines, by the computation device, an urgency degree of a countermeasure against an attack based on an analysis result of the attack progress analysis unit.

Advantageous Effects of Invention

According to one aspect of the present invention, the cyber-security attack can be accurately determined. Other objects, configurations, and effects which have not been described above will become apparent from embodiments to be described hereinafter.

BRIEF DESCRIPTION OF DRAWINGS

FIG. 3A is a table illustrating an example of a data structure of a system intrusion update rule.

FIG. 3B is a table illustrating an example of a data structure of a related scenario update rule.

FIG. 4A is a table illustrating an example of a data structure of vehicle situation information (an intrusion degree).

FIG. 4B is a table illustrating an example of a data structure of vehicle situation information (a scenario correlation degree).

FIG. 5 is a table illustrating an example of a data structure of progress status update threshold information.

FIG. 6 is a table illustrating an example of a data structure of an attack progress information update rule.

FIG. 7 is a table illustrating an example of a data structure of attack progress information.

FIG. 8 is a table illustrating an example of a data structure of scenario step information.

FIG. 9 is a table illustrating an example of a data structure of urgency degree information.

DESCRIPTION OF EMBODIMENTS

Figure 1:
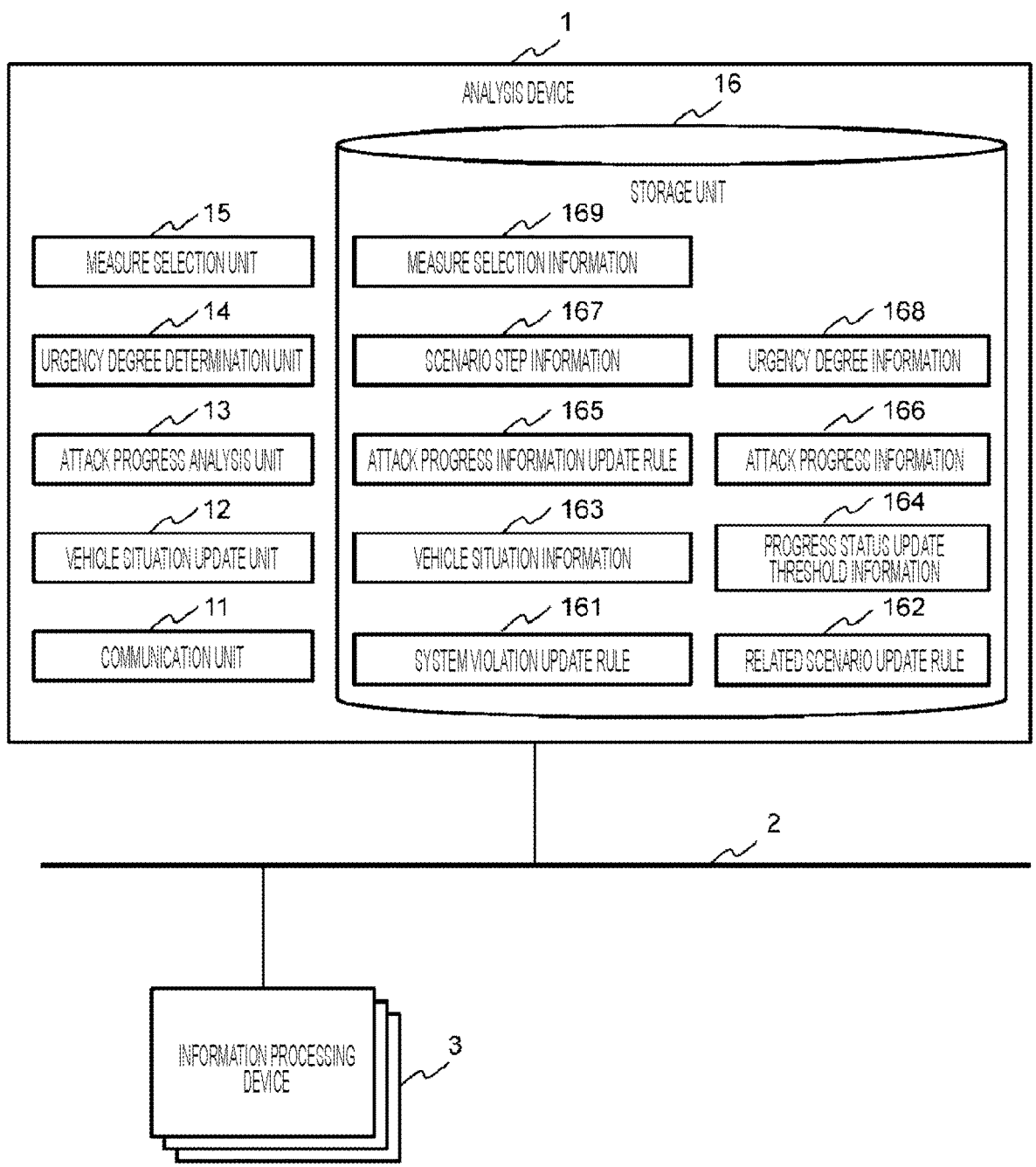
FIG. 1 is a diagram illustrating a configuration of an analysis device.

A method for detecting an intrusion and analyzing an effect in an analysis device connected to an in-vehicle network, in particular, an analysis device 1 capable of selecting a countermeasure according to a progress status of a security attack when detecting the attack will be described as an embodiment of the present invention.

When detecting a cyber-security attack, the analysis device 1 according to the embodiment of the present invention determines a progress status of the attack based on an attack scenario prepared in advance, and selects a countermeasure content according to the determined progress status.

Further, in the analysis device 1 according to the embodiment of the present invention, a vehicle situation update unit 12 updates vehicle situation information 163 according to a received log content to grasp an attack event occurring in an in-vehicle system, an attack progress analysis unit 13 determines the progress status of the attack from the vehicle situation information 163, an urgency degree determination unit 14 calculates an urgency degree of a countermeasure according to the determined progress status to analyze the urgency of the occurring event, and a countermeasure selection unit 15 selects a countermeasure to be implemented based on the analyzed urgency.

More preferably, the vehicle situation update unit 12 collects a log collected from an intrusion detection function in each device mounted on the in-vehicle system, the attack progress analysis unit 13 identifies an intrusion point in each of attack scenarios using the attack scenario in which an intrusion port and a protection target are defined and the vehicle situation information 163, the urgency degree determination unit 14 calculates an urgency degree according to the number of remaining steps from the intrusion location to the protection target in the attack scenario when a route from a certain information processing device 3 to an adjacent information processing device 3 is set as one step, and the countermeasure selection unit 15 selects a countermeasure according to the urgency degree of the attack scenario with a high correlation degree.

Hereinafter, embodiments of the present invention will be described in detail while referring to the drawings.

First Embodiment

In the present embodiment, a description will be given regarding an example of a method by which an analysis device 1 determines an attack progress status based on an attack scenario prepared in advance and selects a countermeasure content corresponding to the progress status when detecting a cyber-security attack. However, the technical idea of the present invention is not limited to the exemplified procedure.

FIG. 1 illustrates a configuration of the analysis device 1 according to the embodiment of the present invention.

The analysis device 1 is mounted on a vehicle, and determines an intrusion on the vehicle side. However, an analysis device may be provided in a center connected to a vehicle by communication, and an intrusion may be determined on the center side. The analysis device 1 is connected to an information processing device 3 (for example, an electronic control device such as an ECU) via a communication bus 2.

However, the communication bus 2 may physically include a plurality of communication buses, and standards of the plurality of communication buses may all be the same or different. These communication buses conform to standards such as CAN (registered trademark), LIN (registered trademark), FlexRay (registered trademark), and Ethernet (registered trademark).

The analysis device 1 includes a CPU (not illustrated), a ROM (not illustrated) which is a non-transitory storage medium, and a RAM (not illustrated), and implements the following functions as the CPU develops and executes a program stored in the ROM on the RAM. Processing performed by the CPU executing the program may be executed by another computation device (for example, hardware such as a field programmable gate array (FPGA) and an application specific integrated circuit (ASIC)). That is, the analysis device 1 includes, as its functions, a vehicle situation update unit 12, an attack progress analysis unit 13, an urgency degree determination unit 14, and a countermeasure selection unit 15. Further, the analysis device 1 includes a storage unit 16 which is a nonvolatile storage device, and a communication unit 11 which is a communication interface and performs computation required for communication.

The communication unit 11 receives a message transmitted from another device via the communication bus 2, and transmits the message to another device via the communication bus 2. As described above, the communication bus 2 may physically include a plurality of communication buses. The analysis device 1 collects information for determining an abnormal state of each device using the communication unit 11. The vehicle situation update unit 12 updates a situation (vehicle situation information) caused by a cyber-security attack in the vehicle using the information collected using the communication unit 11 according to a predetermined rule. When a predetermined condition is satisfied, the attack progress analysis unit 13 identifies a progress status of the attack using the vehicle situation information according to a predetermined rule. The urgency degree determination unit 14 calculates an urgency degree according to the number of remaining routes from an intrusion location to a protection target in an attack scenario. The countermeasure selection unit 15 selects a countermeasure content set for each level according to the level of the urgency degree. Note that the urgency degree determined by the urgency degree determination unit 14 may be output to another information processing device 3 without selecting a countermeasure by the countermeasure selection unit 15.

The storage unit 16 stores a system intrusion update rule 161, a related scenario update rule 162, vehicle situation information 163, progress status update threshold information 164, an attack progress information update rule 165, attack progress information 166, scenario step information 167, urgency degree information 168, and countermeasure selection information 169. In the system intrusion update rule 161, a rule for updating an intrusion degree of the in-vehicle system is defined. In the related scenario update rule 162, a rule for updating an attack scenario related to an occurring event is defined. The vehicle situation information 163 holds an event observed in the in-vehicle system. The progress status update threshold information 164 holds a threshold for determining whether to update the attack progress information 166. In the attack progress information update rule 165, a rule for updating the attack progress information 166 is defined. The attack progress information 166 holds a progress status of an attack. In the scenario step information 167, a total number of steps of an attack scenario is defined. The urgency degree information 168 holds an urgency degree of a countermeasure against an occurring event. In the countermeasure selection information 169, a countermeasure content corresponding to an urgency degree is defined. The storage unit 16 may store a log (not illustrated) which is information collected by the analysis device 1.

Figure 2:
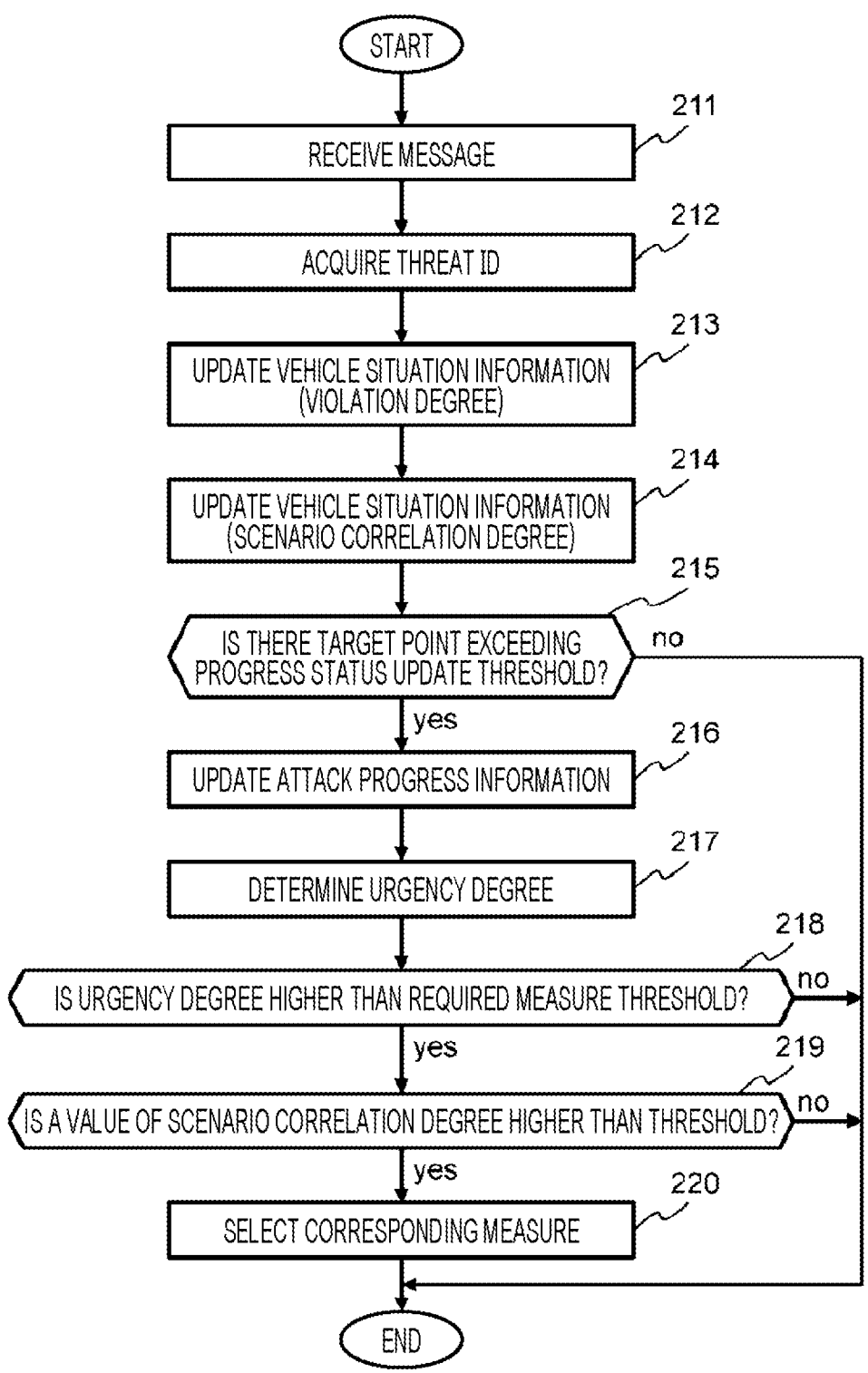
FIG. 2 is a flowchart illustrating processing in which the analysis device selects a countermeasure content.

FIG. 2 illustrates a flow of processing in which the analysis device 1 selects a countermeasure content. A subject that executes each step to be described hereinafter is the CPU (not illustrated) of the analysis device 1, log information to be acquired is log information that can be collected within a certain period, and a plurality of pieces of the log information may be acquired. The processing illustrated in FIG. 2 may be executed at a timing when an ignition switch of the vehicle is turned on and the information processing device 3 starts operating. Further, the processing may be executed at a timing when a countermeasure against a system intrusion is taken, or may be executed at any timing as long as a message can be received from another device.

In step 211, the analysis device 1 collects log information of each of the information processing devices 3 using the communication unit 11 and stores the log information in a memory of the analysis device 1. For example, the analysis device 1 may collect the log information in a predetermined period.

In step 212, the vehicle situation update unit 12 acquires a threat ID from the log information collected in step 211. Note that the threat ID is an identifier that can identify a detection point, a communication source, a communication destination, a related device, a related communication path, an intrusion status, and the like, and is included in the log information acquired from the information processing device 3.

In step 213, the vehicle situation update unit 12 updates the vehicle situation information 163 based on the threat ID acquired in step 212 and the system intrusion update rule 161.

FIG. 3A illustrates an example of a data structure of the system intrusion update rule 161 used by the vehicle situation update unit 12 to update the vehicle situation information 163 in step 213. The system intrusion update rule 161 defines an update rule of a correlation degree related to a revealed threat event, and includes a threat ID 1611 for identifying a threat event and an update differential value 1612 of an intrusion degree related to a device and a communication path affected by the threat event.

FIG. 4A illustrates an example of a data structure of the vehicle situation information (intrusion degree) 163 updated in step 213. The vehicle situation information (intrusion degree) 163 includes a device/communication ID 1631 for identifying a device or communication path that is being intruded and an intrusion degree 1632 that indicates the degree of intrusion.

For example, when the threat ID 1611 acquired in step 212 is "0x01", it can be determined that "Dev1" in column 1613 and "Com1" in column 1614 are being intruded with reference to the system intrusion update rule 161. The vehicle situation update unit 12 acquires the update differential value "10" of Dev1 with the threat ID 1611 of "0x01" from the system intrusion update rule 161, and updates the intrusion degree "320" of the device/communication ID 1631 of "Dev1" in the vehicle situation information (intrusion degree) 163 to "330". Further, the update differential value "15" of Com1 with the threat ID 1611 of "0x01" is acquired from the system intrusion update rule 161, and the intrusion degree "265" of the device/communication ID 1631 of "Com1" in the vehicle situation information (intrusion degree) 163 is updated to "280".

The data recorded in the vehicle situation information (intrusion degree) 163 has an initial value of 0, and an upper limit value may be defined in advance to avoid overflow of the memory. The upper limit value may be a value larger than a threshold defined in the progress status update threshold information 164 (FIG. 5). The vehicle situation information (intrusion degree) 163 may be set to the initial value at a predetermined timing (for example, reset to 0 at predetermined time intervals). The timing for initialization of the vehicle situation information (intrusion degree) 163 may be, for example, an ignition-off time, a normal/abnormal determination time, an abnormality handling time, or the like, and may be the same as or different from an initialization timing of the vehicle situation information (scenario correlation degree) 163 to be described later. Further, the number of generation of the threat IDs may be stored in the vehicle situation information (intrusion degree) 163.

In step 214, the vehicle situation update unit 12 updates the vehicle situation information 163 based on the threat ID acquired in step 212 and the related scenario update rule 162.

FIG. 3B illustrates an example of a data structure of the related scenario update rule 162 used by the vehicle situation update unit 12 to update the vehicle situation information 163 in step 214. The related scenario update rule 162 defines an update rule of a correlation degree related to an revealed threat event, and includes a threat ID 1621 for identifying a threat event and an update differential value 1622 of a scenario correlation degree related to the threat ID per scenario ID.

FIG. 4B illustrates an example of a data structure of the vehicle situation information (scenario correlation degree) 163 updated in step 214. The vehicle situation information (scenario correlation degree) 163 is data related to an attack scenario having a high correlation with an occurring event, and includes a scenario ID 1633 for identifying an attack scenario and a correlation degree 1634 between the occurring event and each scenario.

For example, when the threat ID 1611 acquired in step 212 is "0x01", it can be estimated that intrusions of scenario IDs "S1" and "S3" have occurred. The vehicle situation update unit 12 acquires the update differential value "10" of the scenario ID of S1 with the threat ID 1621 of "0x01" from the related scenario update rule 162, and updates the correlation degree "130" with the corresponding scenario ID 1633 of "S1" in the vehicle situation information (scenario correlation degree) 163 to "140". Further, the update differential value "5" of the scenario ID of S3 with the threat ID 1621 of "0x01" is acquired from the related scenario update rule 162, and the correlation degree "30" with the corresponding scenario ID 1633 of "S3" in the vehicle situation information (scenario correlation degree) 163 is updated to "35".

The vehicle situation information (scenario correlation degree) 163 is updated per device ID with a predetermined number of times (for example, once or 2 to 3 times) as an upper limit. Therefore, the vehicle situation information (scenario correlation degree) 163 does not become a large value even if there is an abnormality in one information processing device 3, and becomes a large value when an abnormality occurs in a plurality of the information processing devices 3. An upper limit may be defined for the vehicle situation information (scenario correlation degree) 163 to avoid overflow of the memory. The vehicle situation information (scenario correlation degree) 163 may be set to an initial value at a predetermined timing (for example, reset to 0 at predetermined time intervals). The timing for initialization of the vehicle situation information (scenario correlation degree) 163 may be the same as or different from the timing for initialization of the vehicle situation information (intrusion degree) 163.

In step 215, the attack progress analysis unit 13 determines whether the intrusion degree of each device and each communication path held in the vehicle situation information (intrusion level) 163 updated in step 213 exceeds the progress status update threshold information 164. The processing proceeds to step 216 if there is at least one device or communication path whose intrusion degree exceeds the progress status update threshold information 164, and ends the processing if there is no device or communication path whose intrusion degree exceeds the progress status update threshold information 164.

FIG. 5 illustrates an example of a data structure of the progress status update threshold information 164 used in step 215. The progress status update threshold information 164 includes a device/communication ID 1641 that indicates a device or a communication path, and a threshold 1642 of the intrusion degree of the device or the communication path.

For example, the intrusion degree 1632 of "320" with the device/communication ID 1631 of "Dev1" in the vehicle situation information (intrusion degree) 163 updated in step 213 is compared with the threshold 1642 of "150" of the intrusion degree with the device/communication ID 1641 of "Dev1" in the progress status update threshold information 164 to determine whether the intrusion degree of the device exceeds the threshold. Further, the intrusion degree 1632 of "265" with the device/communication ID 1631 of "Com1" in the vehicle situation information (intrusion degree) 163 is compared with the threshold 1642 of "150" of the intrusion degree with the device/communication ID 1641 of "Com1" in the progress status update threshold information 164 to determine whether the intrusion degree of the communication path exceeds the threshold. As a result, it is determined that the intrusion of the system has occurred since the intrusion degree exceeds the threshold for both "Dev1" and "Com1". Note that, when the intrusion degree 1632 in the vehicle situation information (intrusion degree) 163 does not exceed the threshold 1642 in the progress status update threshold information 164, it is determined that some kind of abnormality has occurred in the corresponding device and communication path at a level at which no countermeasure needs to be taken immediately.

In step 216, the attack progress analysis unit 13 acquires the device/communication ID 1631 exceeding the threshold in step 215, and updates the attack progress information 166 based on the attack progress information update rule 165 related to the device/communication ID 1631.

FIG. 6 illustrates an example of a data structure of the attack progress information update rule 165 used in step 216. The attack progress information update rule 165 includes a device/communication ID 1651 for identifying a device or communication path and an attack progress status 1652 of an attack progress status in each scenario.

FIG. 7 illustrates an example of a data structure of the attack progress information 166 updated in step 216. The attack progress information 166 is data for identifying the latest attack progress status, and includes a scenario ID 1661 for identifying an attack scenario and a latest attack progress status 1662 of each scenario.

For example, when acquiring "Dev1" as the device/communication ID 1631 that exceed the thresholds and "Com1" as the device/communication ID 1631 that exceed the thresholds in step 215, the attack progress analysis unit 13 acquires progress information "3" of "S1" and progress information "2" of "S3" as the attack progress statuses 1652 of the scenario IDs corresponding to the device/communication ID of "Dev1" in the attack progress information update rule 165, and compares these pieces of progress information with pieces of progress information of the corresponding scenarios in the attack progress information 166. Then, the progress information of the scenario ID 1661 is updated if the attack progress status 1652 in the attack progress information update rule 165 is larger than the progress information in the attack progress information 166, and the progress information of the scenario ID 1661 is not updated if the attack progress status 1652 is equal to or smaller than the progress information in the attack progress information 166. Similarly, progress information "4" of "S1" is acquired as the attack progress status 1652 of the scenario ID in which the device/communication ID 1651 in the attack progress information update rule 165 corresponds to "Com1", and compared with progress information of the corresponding scenario in the attack progress information 166. Then, the progress information of the scenario ID 1661 is updated if the attack progress status 1652 in the attack progress information update rule 165 is larger than the progress information in the attack progress information 166, and the progress information of the scenario ID 1661 is not updated if the attack progress status 1652 is equal to or smaller than the progress information in the attack progress information 166.

In step 217, the urgency degree determination unit 14 acquires the attack progress information 166 updated in step 216, calculates an urgency degree based on the attack progress information 166 and the scenario step information 167, and registers the calculated urgency degree in the urgency degree information 168.

FIG. 8 illustrates an example of a data structure of the scenario step information 167 used in step 217. The scenario step information 167 includes a scenario ID 1671 for identifying an attack scenario and a total number of steps 1672 that is the number of steps of a route from an intrusion port to a protected asset (a control system ECU that can be a final attack target) in each scenario ID.

FIG. 9 illustrates an example of a data structure of the urgency degree information 168 updated in step 217. The urgency degree information 168 includes a scenario ID 1681 for identifying an attack scenario, and the number of remaining steps 1682 which is the number of remaining steps calculated based on the total number of steps 1672 and the attack progress status 1662.

For example, the urgency degree determination unit 14 acquires the attack progress status 1662 of "4" of "S1" in the attack progress information 166 and the total number of steps 1672 of "7" of "S1" in the scenario step information 167 updated in step 216, and registers a value "3" obtained by subtracting the attack progress status 1662 of "4" from the total number of steps of "7" in the number of remaining steps 1682.

In step 218, if a value of the number of remaining steps 1682 calculated in step 217 is equal to or smaller than a threshold of the number of remaining steps determined per scenario ID in advance, the countermeasure selection unit 15 determines that an urgency degree is high and a countermeasure is required, and proceeds to step 219. On the other hand, if the value of the number of remaining steps 1682 is larger than the threshold of the number of remaining steps, it is determined that the urgency degree is not high and no countermeasure is immediately required (observation of a state is sufficient), and the processing is ended. Note that only one threshold may be set, or thresholds may be set in a plurality of stages to set countermeasures respectively corresponding to the stages.

In step 218, the attack progress status may be determined based on time without being determined based on the number of remaining steps. For example, time required for the remaining number of steps to be intruded may be calculated using time taken until the current intrusion, and the number of steps and the number of remaining steps thereof.

In step 219, if a value of the correlation degree 1634 in the vehicle situation information 163 corresponding to the scenario ID 1681 for which the urgency degree has been determined to be high in step 218 is larger than a threshold defined in advance per scenario ID, the countermeasure selection unit 15 proceeds to step 220 since an abnormality has occurred in the plurality of information processing devices 3. On the other hand, if the value of the correlation degree 1634 is not larger than the threshold, it is estimated that an abnormality has occurred in only one information processing device 3, and thus, the processing is ended. Since it is determined whether an abnormality has occurred in the plurality of information processing devices 3 in step 219, erroneous detection can be suppressed. Note that the determination of the correlation degree in step 219 is optional, and a countermeasure may be taken when the urgency degree is high regardless of a scenario correlation value.

In step 220, the countermeasure selection unit 15 uses the countermeasure selection information 169 to identify the urgency degree determined in step 217 and a countermeasure level 1691 and the scenario S 1692 in which the urgency degree corresponds to a required countermeasure threshold in step 218, and selects a relevant countermeasure. This countermeasure level may be determined by the urgency degree, the correlation degree, or the urgency degree and the correlation degree.

Figure 10:
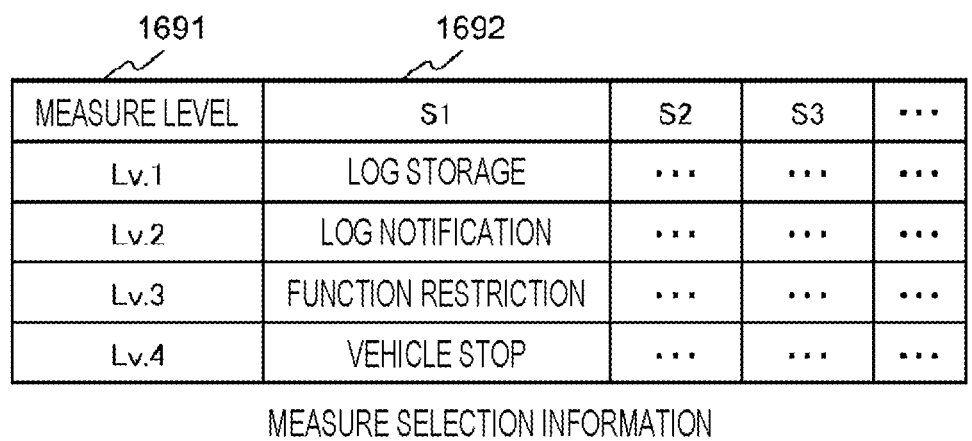
FIG. 10 is a table illustrating an example of a data structure of countermeasure selection information.

FIG. 10 illustrates an example of a data structure of the countermeasure selection information 169 used in step 220.

The countermeasure selection information 169 includes the urgency degree (countermeasure level) 1691 determined in step 218 and the scenario S 1692 indicating a relevant scenario. For example, when the countermeasure level 1691 is Lv.1 and the relevant scenario S 1692 is "S1", the countermeasure selection unit 15 selects log storage as a countermeasure.

Through the above steps, the analysis device 1 selects the countermeasure content when detecting the cyber-security attack.

As described above, according to the embodiment of the present invention, the analysis device 1 determines an attack progress status based on an attack scenario prepared in advance when detecting a cyber-security attack, and selects a countermeasure content according to the progress status. As a result, the countermeasure can be taken at an appropriate timing according to the urgency degree of the cyber-security attack, and thus, it is possible to prevent an excessive countermeasure from being taken and a delay in taking the countermeasure, and to maintain safe and comfortable vehicle traveling control.

As described above, the analysis device according to the embodiment of the present invention includes: the communication unit 11 that receives, by the CPU of the analysis device 1, the log of the information processing device (ECU) 3 mounted on an instrument; the attack progress analysis unit 13 that calculates, by the CPU, the intrusion location on the route from an intrusion point on the instrument to the protected asset (control system ECU that can be the final attack target) from the received log; and the urgency degree determination unit 14 that determines, by the CPU, the urgency degree of the countermeasure against the attack based on the analysis result of the attack progress analysis unit 13, and thus, it is possible to accurately determine the cyber-security attack.

Further, the countermeasure selection unit 15 that selects, by the CPU, a countermeasure to be prioritized based on the determined urgency degree is provided. Thus, an appropriate countermeasure can be taken at an appropriate timing according to the urgency degree of the cyber-security attack, it is possible to prevent an excessive countermeasure from being taken and the delay in taking a countermeasure, and the safe and comfortable vehicle traveling control can be achieved.

Further, the communication unit 11 receives the log (log information including the threat ID) including the intrusion status of the information processing device 3 and the identification information associated with the attack scenario indicating the route from the intrusion point on the instrument the protected asset, and thus, it is unnecessary for each information processing device to transmit detailed information of the intrusion, and an increase in traffic of the communication bus 2 can be suppressed.

Further, the attack progress analysis unit 13 identifies a scenario that is highly likely to occur in the information processing device 3 from the received log, and updates the attack progress information 166 indicating the attack progress status in the identified scenario. Thus, the attack progress status of the attack is determined by the logs received from the plurality of information processing devices 3 so that the erroneous detection can be suppressed.

Further, the urgency degree determination unit 14 determines the urgency degree according to the degree of progress of the attack up to the protected asset by the attack progress analysis unit 13, and thus, a grace period until a serious situation is found by simple processing.

Further, the countermeasure selection unit 15 selects the countermeasure content according to the determined urgency degree, and thus, it is possible to prevent an excessive countermeasure from being taken and the delay in taking a countermeasure.

Note that the present invention is not limited to the above-described embodiments, and may include various modifications and equivalent configurations within a gist of the range of the appended claims. For example, the above-described embodiments have been described in detail in order to describe the present invention in an easily understandable manner, and the present invention is not necessarily limited to one including the entire configuration that has been described above. Further, a part of the configuration of a certain embodiment may be replaced with the configuration of another embodiment. Further, the configuration of a certain embodiment may be added with the configuration of another embodiment.

Further, addition, deletion, or substitution of other configurations may be made with respect to some configurations of each embodiment.

Further, each configuration, function, processing unit, processing means, and the like described above may be, partially or fully, implemented by hardware, for example, by designing it using an integrated circuit and the like, or implemented by software by causing the processor to interpret and execute a program that implements each function.

Information such as programs, tables, and files that realize the respective functions can be stored in a storage device such as a memory, a hard disk, and a solid state drive (SSD), or a storage medium such as an IC card, an SD card, and a DVD.

Further, only a control line and an information line considered to be necessary for the description are illustrated, and all the control lines and information lines required for implementation are not necessarily illustrated. It may be considered that most of configurations are practically connected to each other.

REFERENCE SIGNS LIST 1 analysis device
2 communication bus 3 information processing device
11 communication unit
12 vehicle situation update unit
13 attack progress analysis unit
14 urgency degree determination unit
15 countermeasure selection unit
16 storage unit

The invention claimed is:

1. An analysis device, configured using a computer including a computation device that executes predetermined computation processing and a storage device accessible by the computation device, the analysis device comprising:
one or more processors, the one or more processors configured to:
receive a log of an information processing device of a plurality of information processing devices mounted on an instrument;
calculate an intrusion location in a route from an intrusion point on the instrument to a protected asset from the received log;
acquire a threat ID for identifying a threat event from the received log;
update a vehicle situation information comprising an intrusion degree and a device ID stored in the storage device based on the threat ID, wherein the device ID identifies the information processing device being intruded on and the intrusion degrees indicates a degree of intrusion;
compare the intrusion degree for each information processing device of the plurality of information processing devices to a threshold; and
after determining that at least one intrusion degree is above the threshold, calculate an urgency degree of a countermeasure against an attack based on a comparison result of a comparison between a number of remaining steps from the intrusion point to the protected asset analyzed and a predetermined threshold value;
wherein each of the plurality of information processing devices is associated with a respective vehicle situation information, the vehicle situation information updated per device ID to a predetermined number of times.

2. The analysis device according to claim 1, the one or more processors further configured to select, a countermeasure to be prioritized based on the determined urgency degree.

3. The analysis device according to claim 1, wherein the one or more processors receive the log including an intrusion status of the information processing device and identification information associated with an attack scenario indicating the route from the intrusion point on the instrument to the protected asset.

4. The analysis device according to claim 1, wherein the one or more processors are further configured to:
identify a scenario that is highly likely to occur in the information processing device from the received log, and
update attack progress information indicating an attack progress status in the identified scenario.

5. The analysis device according to claim 1, wherein the one or more processors are further configured to determine the urgency degree according to a degree of progress of the attack to the protected asset.

6. The analysis device according to claim 2, wherein the one or more processors are further configured to select a countermeasure content according to the determined urgency degree.

7. An analysis method by which an analysis device analyzes a state of an information processing device of a plurality of information processing devices mounted on an instrument,
the analysis device being configured using a computer including a computation device that executes predetermined computation processing and a storage device that is accessible by the computation device,
the analysis method comprising:
receiving, by the computation device, a log of the information processing device mounted on the instrument by the computation device;
calculating, by the computation device, an intrusion location in a route from an intrusion point on the instrument to a protected asset from the received log;
acquiring, by the computation device, a threat ID for identifying a threat event from the received log;
updating, by the computation device, a vehicle situation information comprising an intrusion degree and a device ID stored in the storage device based on the threat ID, wherein the device ID identifies the information processing device being intruded on and the intrusion degrees indicates a degree of intrusion;
comparing, by the computation device, the intrusion degree for each information processing device of the plurality of information processing devices to a threshold; and
after determining that at least one intrusion degree is above the threshold, determineing, by the computation device, an urgency degree of a countermeasure against an attack based on a comparison result of a comparison between a number of remaining steps from the intrusion point to the protected asset analyzed and a predetermined threshold value;
wherein each of the plurality of information processing devices is associated with a respective vehicle situation information, the vehicle situation information updated per device ID to a predetermined number of times.

8. The analysis method according to claim 7, further comprising a selecting, by the computation device, a countermeasure to be prioritized based on the determined urgency degree.

9. The analysis method according to claim 7, wherein the computation device receives the log including an intrusion status of the information processing device and identification information associated with an attack scenario indicating the route from the intrusion point on the instrument to the protected asset.

10. The analysis method according to claim 7, wherein the computation device identifies a scenario that is highly likely to occur in the information processing device from the received log, and updates attack progress information indicating an attack progress status in the identified scenario.

11. The analysis method according to claim 7, wherein, the computation device determines the urgency degree according to a degree of progress of the attack to the protected asset.

12. The analysis method according to claim 8, wherein the computation device selects a countermeasure content according to the determined urgency degree.

* * * * *